United States Patent
Stafford et al.

(10) Patent No.: US 12,455,777 B1
(45) Date of Patent: *Oct. 28, 2025

(54) SYSTEMS AND METHODS FOR CONTROLLING CLOUD-BASED APPLICATION ACCESS TO RESOURCES VIA A USER AGENT CLIENT APPLICATION

(71) Applicant: Auctane, LLC, Austin, TX (US)

(72) Inventors: Tobias J. Stafford, Austin, TX (US); Byron J. Wier, Austin, TX (US); Paul D. Henry, Austin, TX (US)

(73) Assignee: Auctane, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/616,110

(22) Filed: Mar. 25, 2024

Related U.S. Application Data

(63) Continuation of application No. 18/083,466, filed on Dec. 16, 2022, now Pat. No. 11,943,151, which is a continuation of application No. 17/384,668, filed on Jul. 23, 2021, now Pat. No. 11,563,694, which is a continuation of application No. 16/775,146, filed on
(Continued)

(51) Int. Cl.
| | |
|---|---|
| G06F 15/173 | (2006.01) |
| G06F 3/04842 | (2022.01) |
| G06F 9/48 | (2006.01) |
| G06F 9/52 | (2006.01) |
| G06Q 10/083 | (2023.01) |
| G06Q 10/0833 | (2023.01) |
| H04L 67/00 | (2022.01) |
| G06F 16/903 | (2019.01) |

(52) U.S. Cl.
CPC .......... *G06F 9/526* (2013.01); *G06F 3/04842* (2013.01); *G06F 9/4881* (2013.01); *G06Q 10/083* (2013.01); *G06Q 10/0833* (2013.01); *H04L 67/34* (2013.01); *G06F 16/903* (2019.01)

(58) Field of Classification Search
CPC ....................................................... H04L 67/34
See application file for complete search history.

(56) References Cited

U.S. PATENT DOCUMENTS 10,621,239 B2 *  4/2020  Irons ..................... G06F 3/1204
10,824,982 B1 *  11/2020  Whitehouse ....... G06Q 10/0832
(Continued)

*Primary Examiner* — Hee Soo Kim

(57) ABSTRACT

Systems and methods which facilitate access to computing resources by cloud-based applications are described. Embodiments enable cloud-based applications to provide output to and/or obtain input from computing resources, such as printers, scales, scanners, and storage devices, for performing various functions. In operation according to embodiments, a user agent client application is executed by computing equipment in communication with a computing resource to which access is to be provided to one or more cloud-based applications. Although embodiments implement a user interface client application which is separate from a user agent client application, tight integration between a user interface client application and user agent client application may be provided. Embodiments not only facilitate operation whereby a cloud-based application is enabled to provide output to and/or obtain input from computing resources, but also facilitate remote and/or shared client interaction with such computing resources.

20 Claims, 5 Drawing Sheets

Related U.S. Application Data

Jan. 28, 2020, now Pat. No. 11,095,572, which is a continuation of application No. 16/143,395, filed on Sep. 26, 2018, now Pat. No. 10,574,587, which is a continuation of application No. 14/753,918, filed on Jun. 29, 2015, now Pat. No. 10,129,172.

(60) Provisional application No. 62/082,393, filed on Nov. 20, 2014.

(56) References Cited

U.S. PATENT DOCUMENTS

| | | | |
|---|---|---|---|
| 2007/0073551 A1* | 3/2007 | Williams | G06Q 10/101 705/26.1 |
| 2007/0299686 A1* | 12/2007 | Hu | G06Q 10/08 705/334 |
| 2012/0216133 A1* | 8/2012 | Barker | G06F 21/53 715/760 |
| 2014/0229348 A1* | 8/2014 | Vyas | G06Q 20/047 705/35 |

* cited by examiner

SYSTEMS AND METHODS FOR CONTROLLING CLOUD-BASED APPLICATION ACCESS TO RESOURCES VIA A USER AGENT CLIENT APPLICATION

CROSS-REFERENCE TO RELATED APPLICATIONS

This application is a continuation of U.S. patent application Ser. No. 18/083,466, filed Dec. 16, 2022, now U.S. Pat. No. 11,943,151, which is a continuation of U.S. patent application Ser. No. 17/384,668, filed Jul. 23, 2021, now U.S. Pat. No. 11,563,694, which is a continuation of U.S. patent application Ser. No. 16/775,146, filed Jan. 28, 2020, now U.S. Pat. No. 11,095,572, which is a continuation of U.S. patent application Ser. No. 16/143,395, filed Sep. 26, 2018, now U.S. Pat. No. 10,574,587, which is a continuation of U.S. patent application Ser. No. 14/753,918, filed Jun. 29, 2015, now U.S. Pat. No. 10,129,172, which claims the benefit of U.S. Provisional Application Ser. No. 62/082,393 filed Nov. 20, 2014, all of which are herein incorporated by referenced in their entirety.

TECHNICAL FIELD

The invention relates generally to facilitating access to resources by cloud-based applications and, more particularly, to enabling cloud-based applications to provide output to and/or obtain input from computing resources, such as printers, scales, scanners, and storage devices, for performing various functions, such as providing shipping related functionality.

BACKGROUND

The use of various forms of computing equipment to automate or otherwise perform a number of tasks has become widespread. With the proliferation of processor-based platforms, such as personal computers (PCs), tablet devices, smart phones, personal digital assistants (PDAs), and servers, capable of executing instruction sets for providing specialized or generalized functionality, such as word processing, accounting, document generation and management, printing, data communication, and image capture, generation, and management, the use of such computing equipment has become nearly ubiquitous in both business as well as personal settings. One example of functionality that is provided through the use of such computing equipment is the automation of tasks associated with the shipment of items, including the management of item orders, managing the picking and packing of items for order fulfilment, generation of invoices, packing slips, manifests, shipping labels, and postage or other prepaid shipping indicia, and tracking of shipment of items through a shipping service provider, as provided by the SHIPSTATION shipping management system provided by Auctane LLC of Austin Texas.

A number of different fundamental configurations have been implemented with respect to the system implementations for providing the various functionality. For example, localized deployment of one or more applications, wherein the application(s) providing the instructions for implementing various tasks is stored and executed by computing equipment local to the user (e.g., a user device, such as a PC, tablet device, smart phone, or PDA), may be utilized for providing desired functionality. Alternatively, cloud-based deployment of one or more applications, wherein the application(s) providing the instructions for implementing various tasks is stored and executed by computing equipment disposed in a network "cloud" (e.g., a group of servers remote from the user), may be utilized for providing desired functionality. Each such configuration, however, has advantages and disadvantages associated therewith.

Configurations implementing localized deployment of applications provide advantages with respect to the applications ability to interoperate or otherwise interact with peripherals local to the user. For example, in performing one or more tasks of the functionality enabled by the localized application it may be desirable to provide output to and/or obtain input from one or more computing resources, such as printers, scales, scanners, and storage devices, disposed local to the user or otherwise under control of or accessible by the user. As a specific example, the localized application may comprise a shipping management program whereby a user may wish to have the weight of an item to be shipped input by an electronic scale and/or a shipping label printed in association with shipping related functionality provided by the application. In a localized application configuration, the application generally has direct access to such computing resources, such as to directly communicate with and control the operation of those resources, thereby facilitating user interaction with the application which results in the desired operation of the resources.

However, such configurations implementing localized deployment of applications have disadvantages associated with the deployment and maintenance of the localized applications. For example, the user or other user entity must obtain and maintain computing equipment (e.g., processor capability, memory capacity, etc.) sufficient to store and execute the localized application(s). Moreover, the user or other user entity must manage and monitor the lifecycle of the application(s) (e.g., install and configure the application, maintain version control, obtain and install updates and patches, coordinate resource interoperability maintenance, etc.). Such management and maintenance associated with localized applications can be quite expensive in terms of monetary costs, time, and computing resources.

Accordingly, configurations implementing cloud-based deployment of applications have become quite popular in recent years. Such cloud application deployments provide advantages with respect to the deployment and maintenance of the applications. For example, the burden for obtaining and maintaining computing equipment (e.g., processor capability, memory capacity, etc.) sufficient to store and execute the application(s) is largely placed upon the cloud application provider. A user of the cloud application typically needs only a relatively modestly equipped client system (e.g., processor-based system executing a browser, such as INTERNET EXPLORER, GOOGLE CHROME, or FIREFOX, or thin client application) in order to interface with and implement functionality of the cloud application. Moreover, the user is relieved of the need to manage or monitor the lifecycle of the application(s). Instead, the cloud application provider generally installs and configures the application, maintains version control, obtains and installs updates and patches, coordinates resource interoperability maintenance, etc. Accordingly, the users are enabled to enjoy the various upgrades, enhancements, and patches to the applications as they are put online by the cloud application provider, without the user having to maintain or monitor the application lifecycle. Thus, users of such configurations implementing cloud-based deployment of applications are typically saved significant expenses in terms of monetary costs, time, and computing resources.

Nevertheless, such configurations implementing cloud-based deployment of applications have disadvantages associated therewith. For example, as discussed above, it may be desirable to provide output to and/or obtain input from one or more computing resources disposed local to the user or otherwise under control of or accessible by the user in performing one or more tasks of the functionality enabled by the applications. In a cloud-based application configuration, the cloud application generally does not have direct access to such computing resources, and thus cannot directly communicate with and control the operation of those resources. For example, security features of browsers inhibit direct interaction with or control of various resources by a cloud application, such as to prevent unauthorized or malicious use of such resources (e.g., the unsolicited printing of coupons or advertising media when a user interfaces with a webpage, the harvesting of personal or sensitive data by a webserver, etc.). Although providing desired security with respect to the unauthorized or malicious use of resources, such inhibiting direct interaction with or control of resources by the cloud application results in an inability by the cloud application to directly implement particular user interaction which results in desired operation of the resources. For example, if a user wishes to print to a local printer from a cloud application using a browser client, the user must control the cloud application to download an electronic instance of the desired document (e.g., as a portable document format (PDF) file) to the browser and then utilize printing functionality of the browser itself (a localized application) to print the document. This operation requires multiple steps, including steps which are external to the cloud application.

One attempt at a solution to the inability to print directly from a cloud-based application has been made in the form of the GOOGLE CLOUD PRINT product. GOOGLE CLOUD PRINT provides a cloud server based solution which is integrated with the user's browser to connect printers to the web, whereby the printers are made available to applications via a GOOGLE CLOUD PRINT server and web browser in communication with the printer. Although enabling a cloud application to ultimately print to a user's printer, the document to be printed must first be rendered as a PDF file, transmitted to the GOOGLE CLOUD PRINT server, and then retransmitted to the web browser which is in communication with the printer. This repeated transmission of the document print file can result in appreciable delay in printing of the document, particularly when the document is large or complicated, and thus does not provide an adequate solution for all situations.

Another solution has been to implement a light server at the user device for enabling printing. FIG. 1 shows an implementation such a light server. The light server configuration provides a relatively small application (e.g., smaller than an application providing a fully featured server configuration) which provides operation for, or emulating, certain functionality of a server.

User interface client application 121 is natively adapted to interact with a server (e.g., web server), such as using the hypertext transfer protocol (HTTP). Communication link 101 between user interface client application 121 and cloud-based application 111 may thus provide a HTTP communication link. Light server 122 provides an interface emulating that of a server for which user interface client application 121 is adapted to communicate (e.g., providing a HTTP interface) for interacting with user interface client application 121 and cloud client application 121A to control printer 130. Accordingly, communication link 102 between user interface client application 121 and light server 122 may thus provide a HTTP communication link. Light server 122 may implement an application programming interface (API) or other suitable interface to enable communication link 103 between light server 122 and printer 130. Light server 122 interacts with cloud-based application 111 to receive data to be provided to printer 130. Accordingly, communication link 104 between light sever 122 and cloud-based application 111 may provide a HTTP communication link.

In operation, a user may interact with cloud-based application 111 using cloud client application 121A hosted by user interface client application 121 in order to perform desired functionality supported by system 100. Where the interaction initiates tasks involving the use of printer 130, cloud client application 121A may direct commands (e.g., requests, control messages, etc.) to light server 122.

It should be appreciated that it may be desirable to implement security with respect to the communications transmitted external to user device 120, such as to prevent unauthorized monitoring of the communications, to avoid fraudulent use of the cloud-based application, etc. Accordingly, communication link 101 and/or communication link 104 between user device 120 and cloud-based application 111 may be configured to provide requisite security, such as by implementing a hypertext transfer protocol secure (HTTPS) communications protocol. The implementation of such secure communications protocol may employ the use of appreciable resources, such as memory and computing cycles, in obfuscating and de-obfuscating (e.g., encrypting and unencrypting) the data placed on the secure communication link. Accordingly, in addition to it typically not being necessary to secure communications internal to user device 120, it may not be practical or possible to implement such secure communications protocols with respect to communication link 102 between light server 122 and cloud client application 121A. For example, when implementing a secure sockets layer (SSL) protocol for providing secure communications the distribution of a "server identification certificate" (or SSL certificate) is typically utilized. Servers are generally required to keep the "private" portion of the SSL certificate protected and secret, while distributing the "public" portion of the SSL certificate to any requesting party. However, distributing the full SSL certificate with a client application (here, the light server executable on the user device) would breach that security by effectively making the "private" portion of the SSL certificate public. Moreover, light server 122 may require appreciably more computer code to implement such secure communications protocols, thus rendering the application less "light." Likewise, the use of such secure communications protocols at light server 122 and user interface client application 121 to secure communication link 102 may consume considerable processing power of user device 120. Accordingly, although such secure communication protocols may be implemented with respect to communication link 101 and/or communication link 104, configurations may not implement a secure communication protocol with respect to communication link 102.

As data security issues continue to evolve, changes in the implementation of security techniques by user interface client applications, such as web browsers, are implemented. In a recent iteration of such security technique changes, many web browsers have implemented procedures to prohibit simultaneously maintaining both secure and unsecure communication links with respect to a same cloud client application. Essentially, if the application is running in a secure "SSL" mode in the browser, then it must only communicate with other "secure" servers as per these recently introduced security restrictions. Accordingly, instances of light server 122 may be required to utilize secure communication protocols with respect to communication link 102 where secure communication protocols are utilized with respect to communication link 101. Such an implementation may result in an undesirable or impractical configuration of the light server and/or undesired performance by user device 120.

BRIEF SUMMARY

The present invention is directed to systems and methods which facilitate access to resources by cloud-based applications. Embodiments of the invention enable cloud-based applications to provide output to and/or obtain input from computing resources, such as printers, scales, scanners, and storage devices, for performing various functions, such as providing shipping related functionality.

In operation according to embodiments of the invention, a user agent client application (embodiments of which are referred to herein as a "Connect Workstation") is executed by computing equipment in communication with a resource to which access is to be provided to one or more cloud-based applications. For example, a user's PC having various resources, such as a printer, scanner, and scale, coupled thereto may execute an instance of Connect Workstation, whereby Connect Workstation interacts with one or more cloud-based application to enable the cloud-based application to output to and/or obtain input from one or more of the resources. In operation, a user may interact with the cloud-based application via a user client interface application, such as a well-known web browser interface (e.g., using a cloud client application or applet operable within the web browser). However, interaction between the cloud-based application and resources at the user's PC need not be through that client interface platform, instead being managed through the user agent client application. That is, embodiments of the invention provide a localized application (e.g., the Connect Workstation) that has direct access to computing resources, to directly communicate with and control the operation of those resources, whereby through cooperation of the localized application and cloud-based application the cloud-based application is enabled to access and utilize the resources.

Operation according to embodiments provides for communication of the data (e.g., print documents, scan files, scale data, etc.) to/from the various resources between the cloud-based application and the user agent client application (e.g., Connect Workstation) without transmission to the user interface client application (e.g., web browser) or an intermediate server (e.g., a cloud print server). Such embodiments facilitate efficient communication of the data and rapid performance of tasks involving the resources (e.g., printing, scanning, weighing, etc.).

Although embodiments implement a user interface client application (e.g., web browser) which is separate from a user agent client application (e.g., Connect Workstation), tight integration between a user interface client application and user agent client application may be provided. Communication may be provided between the user interface client application and one or more user agent client application. For example, a user may be provided control of various resources through the user interface client application using the aforementioned communication with the user agent client application. Additionally or alternatively, a user may be provided information regarding the various resources, such as the operational state of a resource (e.g., online/offline, requires attention, toner low, paper jam, etc.), the status of a task (e.g., printing in process/complete, scanning in process/complete, etc.), and/or the like. Such communication may be direct between the user interface client application and the user agent client application or may be indirect, such as via a cloud-based application in communication with both the user interface client application and user agent client application. Such integration between a user interface client application and a user agent client application may provide operation with respect to a cloud-based application which emulates direct access to computing resources by the cloud-based application or otherwise appears to the user as if the cloud-based application is directly communicating with and controlling the operation of the resources. For example, a user may utilize the user interface client application to interact with the cloud-based application and select a task, such as printing a shipping label, which invokes operation of a resource, such as a local printer, without the user interface client application itself actually engaging in or otherwise controlling the resource operation (e.g., the print control of a web browser, and thus the security aspect thereof, is not invoked).

Embodiments which implement particular configurations of a user agent client application which is separate from a user interface client application not only facilitate operation whereby a cloud-based application is enabled to provide output to and/or obtain input from computing resources, but also facilitates robust user and/or client interaction with such computing resources. For example, not only is a user at the user's PC to which a particular resource is connected enabled to utilize a cloud-based application for tasks as if the cloud-based application has direct control of the local resource, but so too is the user enabled to utilize the cloud-based application for tasks employing any resources in communication with a user agent client application is in communication and for which the user is authorized. As one example, a companywide network of resources may be made available to authorized users thereof, irrespective of the physical locations of the resources and the particular processor-based platform utilized by a user. Moreover, using a user agent client application according to embodiments of the invention, various configurations of processor-based platforms (e.g., tablet devices, smart phones, and PDAs) which themselves may not have the desired resource coupled thereto, and may not be capable of directly coupling to such resources, may be utilized by users in performing tasks employing the resources.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
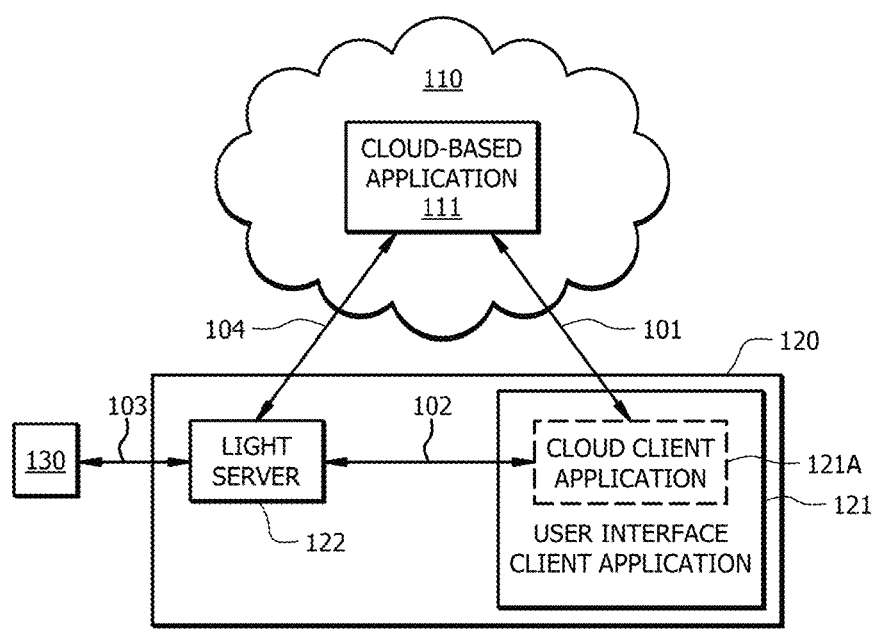
FIG. 1 shows an implementation of a light server solution for providing printing.
Figure 2A:
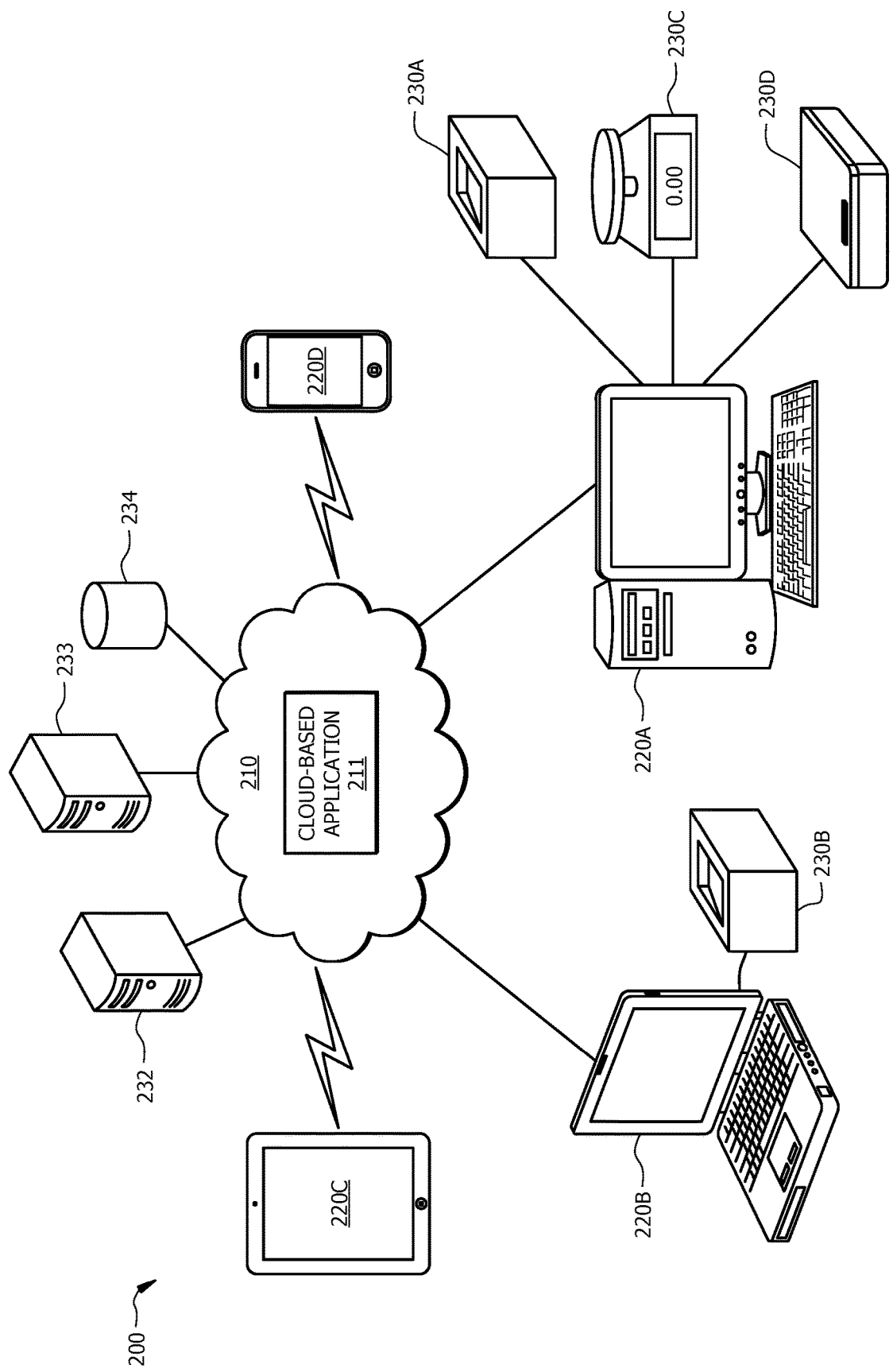
FIG. 2A shows a cloud-based system adapted to provide access to computing resources according to embodiments of the invention.

FIG. 2A shows an embodiment of cloud-based system 200 adapted according to concepts of the present invention. System 200 of the illustrated embodiment includes network 210 in which cloud-based application 211 is present. It should be appreciated that although a single cloud-based application is shown for simplicity, embodiments of a cloud-based system may comprise any number of cloud-based applications, wherein such cloud-based applications may be similar and/or different with respect to any other cloud-based application.

Cloud-based application 211 comprises a cloud-based deployment of an application which stored and executed by computing equipment disposed in the "cloud" of network 210. Accordingly, cloud-based application 211 may comprise computer executable code executing on one or more processor-based systems (e.g., web servers) deployed in network 210. Cloud-based application 211 may, for example, comprise a system providing various desired functionality such as in the form of software as a service (SaaS), infrastructure as a service (IaaS), platform as a service (PaaS), unified communications as a service (UCaaS), etc.

Cloud based application 211 may, for example, comprise a shipping management system operable to provide the automation of tasks associated with the shipment of items, including the management of item orders, managing the picking and packing of items for order fulfilment, generation of invoices, packing slips, manifests, shipping labels, and postage or other prepaid shipping indicia, and/or tracking of shipment of items through a shipping service provider. In an exemplary embodiment, a shipping management system configuration of cloud based application 211 may be operable to provide various functionality associated with the processing and shipment of various items. Such a shipping management system of embodiments may, for example, provide functionality for the processing and shipment of various items by a merchant or other shipper to a purchaser or other recipient as well as for the processing and return shipment of such items by the purchaser or other recipient to the merchant or other original shipper. Such functionality provided according to embodiments of a shipping management system includes for the automation of tasks associated with the shipment of items, including the management of item orders, managing the picking and packing of items for order fulfilment, generation of invoices, packing slips, manifests, shipping labels, and postage or other prepaid shipping indicia, and/or tracking of shipment of items through a shipping service provider. For example, a shipping management system may comprise some or all of the functionality of a shipping management system, such as the SHIPSTATION shipping management system provided by Auctane LLC of Austin Texas, adapted to further provide for the return shipment of items according to the concepts herein. Additionally, embodiments of a shipping management system may provide functionality for managing return requests, processing of return requests, authorizing returns, tracking of the processing of a return request, tracking of return shipments, generating return shipping labels, generating return postage indicia, and/or the like. In particular, embodiments of a shipping management system provide a multi-carrier shipping management system capable of providing shipping functionality (e.g., rating, shipping indicia generation, packing list printing, shipping label printing, tracking, carrier pickup request, manifest printing, account management and payment, etc.) for a plurality of carriers or shipping service providers (e.g., the United States Postal Service (USPS), United Parcel Service (UPS), Federal Express, DHL, local couriers, etc.), thereby providing a multi-carrier shipping management platform.

It should be appreciated that the "cloud" environment associated with system 200, and network 210 thereof, may comprise various applications, systems (e.g., server systems 232 and 233), devices (e.g., storage 234), etc. in addition to cloud-based application 211, as may be utilized by or otherwise operable with cloud-based application 211 for providing desired functionality. For example, embodiments of system 200 wherein cloud-based application 211 comprises a shipping management system may comprise one or more postage system (e.g., as server system 232), one or more shipping service provider system (e.g., as server system 233), and or one or more databases (e.g., as storage 234), such as may be utilized by or otherwise operable with the shipping management system for providing shipping functionality (e.g., multi-carrier (multiple shipping service provider) and/or multi-channel (multiple commerce channel shipping functionality).

Network 210 of the illustrated embodiment provides communication links facilitating the communication between various systems and components of system 200, such as storage 234, server systems 232 and 233, user devices 220A-220D, and cloud-based application 211. Accordingly, network 210 may comprise any number of network configurations, such as the Internet, an intranet, the public switched telephone network (PSTN), a local area network (LAN), a metropolitan area network (MAN), a wide area network (WAN), a cellular network, a wireless network, a cable transmission network, and/or the like.

User devices 220A-220D of embodiments comprise processor-based systems (e.g., a terminal in the form of one or more computer, workstation, kiosk terminal, portable processor-based device, etc.) operable under control of one or more instruction set (e.g., software, firmware, applet, etc.) adapted to cooperate with cloud-based application 210 to provide desired functionality, such as the aforementioned exemplary shipping management functionality. User devices 220A and 220B of the illustrated embodiment, for example, comprise computer systems having a processor, memory, and input/output to enable interaction with cloud-based application 211 for providing at least some portion of functionality available through operation of system 200. User device 220C of the illustrated embodiment, however, comprises a tablet device having a processor, memory, and input/output to enable interaction with cloud-based application 211 for providing at least some portion of functionality available through operation of system 200. User device 220D of the illustrated embodiment comprises a smart phone having a processor, memory, and input/output to enable interaction with cloud-based application 210 for providing at least some portion of functionality available through operation of system 200. The communication links between the user devices and the other nodes of system 200 (e.g., cloud-based application 211, computing resources 230A-230D, and other ones of user devices 220A-220D) may comprise wired links (e.g., as illustrated for user devices 220A and 220B) or wireless links (e.g., as illustrated for user devices 220C and 220D), as well as combinations thereof. It should be appreciated that, although the illustrated embodiment shows a representative example of the number and configuration of user devices as may be utilized with respect to system 200, the concepts of the present invention are not limited to application to the particular number or configuration of user devices shown.

A postage system configuration of server system 232 may comprise one or more processor-based systems (e.g., web servers) operable to provide prepaid postage account and postage indicia generation services (e.g., to generate postage indicia, shipping labels, etc. acceptable by the USPS and/or other shipping service providers). For example, server system 232 may comprise one or more server of the online postage service offered by Stamps.com Inc., or other third party service providers (e.g., postage service providers, pack and ship service providers, shipping insurance service providers, etc.). Various individuals (shippers, purchasers, etc.) and/or other entities (e.g., business entities, merchants, etc.) may maintain an account with respect to server system 232 facilitating the generation of postage indicia, whether individually, in batch, in combination with other documentation (e.g., shipping labels, bills of lading, manifests, customs documents, etc.), and whether directly by the account holder or indirectly, such by operation of a shipping management system of cloud-based application 111. Prepaid value associated with such accounts may be stored by, or in association with, the postage system, such as within a postage security device (PSD). Additional or alternative information may be stored by, or in association with, the postage system, such as user credentials utilized in validating users for account access, usage logs for accounting and/or fraud prevention/detection, rating information for use in shipping service rate determinations, etc.

A shipping service provider system configuration of server system 233 may comprise one or more processor-based systems (e.g., web servers) operable to provide functionality with respect to shipping services provided by a shipping service provider. For example, server system 233 may comprise one or more server associated with the USPS providing an interface for accessing tracking data with respect to shipments made via USPS provided shipping services. Accordingly, various individuals (shippers, intended recipients, etc.) and/or other entities (e.g., businesses, merchants, etc.) may utilize tracking numbers and/or other information to access shipment tracking information throughout the shipment of items by the shipping service provider.

Functionality in addition to or in the alternative to the aforementioned postage generation services provided by server system 232 and the aforementioned shipment tracking services provided by server system 233 may be provided by these and/or one or more other systems of system 200 (not shown), according to embodiments. For example, functionality may be provided by one or more servers (e.g., manufacturers' systems, distributors' systems, product database systems, etc.) to provide information relevant to shipping various items (e.g., weight information used to determine shipping service rates, item content information used to determine shipping services available for use with respect to particular items, such as in the case of hazardous materials, package size information used to determine shipping service rates and/or compatibility with respect to particular items, etc.). It should be appreciated that the functionality provided by various servers and/or other systems of the cloud environment of system 200 of embodiments is not limited functionality directly related to the management of the shipment of items. For example, one or more servers may be present in the cloud environment which are operable to provide online electronic commerce sites (e.g., online merchant stores), electronic marketplaces (e.g., eBay and Amazon Marketplace), etc. (collectively referred to herein as commerce channels) Multiple such commerce channel sites may be in communication with a shipping management system configuration of cloud-based application 211 of embodiments, thereby providing a multi-channel shipping management platform.

Storage 234 shown in the illustrated embodiment disposed in the cloud environment of network 210 may, for example, comprise various forms of tangible, non-transitory computer readable media. For example, storage 234 of embodiments may comprise random access memory (RAM), read only memory (ROM), flash memory, disk memory, magnetic memory, optical memory, etc. Storage 234 may comprise a storage array or other storage system, such as a redundant array of independent disks (RAID) array, a storage area network (SAN), a network attached storage (NAS) array, and/or the like. Such computer readable storage may be utilized to store various information, including program code of cloud-based application 211, program code of client applications utilized with respect to cloud-based application 211, server system 232, and/or server system 233, data utilized by and/or with any or all of cloud-based application 211, server system 232, server system 233, and their client applications, etc. Portions of storage 234 may comprise a part of one or more systems of the cloud (e.g., server system 232 and/or server system 233) and/or may be separate from such systems (e.g., provided as an independent database system).

From the foregoing it can be appreciated that user devices 220A-220D, server system 232, and/or server system 233 of embodiments comprise processor-based systems operating under control of one or more instruction set (e.g., software, firmware, applet, etc.) to provide operation as described herein. Such processor-based systems may comprise a central processing unit (CPU) (e.g., a processor from the PENTIUM or CORE line of processors available from Intel Corporation), memory (e.g., random access memory (RAM), read only memory (ROM), flash memory, disk memory, optical memory, etc.) storing the aforementioned one or more instruction set and/or other data used herein, and appropriate input/output circuitry and devices (e.g., network interface card (NIC), keyboard, digital pointer, display screen, peripheral interface, microphone, speaker, wireless interface, etc.).

Various peripherals and other computing resources useful in providing functionality available through operation of system 200 may be coupled to or otherwise in communication with user devices of embodiments. For example, computing resources, such as one or more printer (e.g., thermal printer, ink printer, laser printer, etc.), imaging device (e.g., optical scanner, barcode scanner, handheld scanner, camera, biometric sample scanner, etc.), scale (e.g., electronic scale, digital scale), memory device (e.g., optical disk drive, hard disk drive, solid state disk drive, etc.), and/or the like, may be provided for use with any or all of the foregoing processor-based systems according to embodiments herein. Computing resources 230A and 230B, shown in the illustrated embodiment as printers (e.g., printer for printing proof of payment indicia, bills of lading, manifests, receipts, shipping labels, etc.) are shown as being coupled to user devices 220A and 220B, respectively. Similarly, computing resource 230C, shown as a scale (e.g., an electronic scale for weighing items for shipping), and computing resource 230D, shown as an imaging device (e.g., a scanner for obtaining images of shipping items, for scanning barcodes, for scanning addresses or other shipping item information, etc.), are shown as being coupled to user device 220A of the illustrated embodiment. Of course, configurations and deployments of computing resources different than that shown may be utilized according to embodiments of the invention.

User device 220A may, for example, be configured for use by a merchant or other shipper to operate with an electronic commerce or marketplace system of the cloud environment to offer items for sale and/or with shipping management system of cloud-based application 211 for managing orders of such items, outbound shipments of the items of such orders, and return of items by purchasers or other recipients thereof. For example, user device 220A may be configured to operate with a shipping management system implementation of cloud-based application 211 to import orders from a plurality of marketplace systems of a multi-channel (e.g., Amazon.com, eBay, etc.) ecommerce environment, convert the order data to a unified format for facilitating shipping management functionality of the shipping management system, and provide shipping management control, reporting, and operation under control of a user. Accordingly, the illustrated embodiment of user device 220A includes a number of computing resources 230A, 230C, and 230D, as may be utilized in facilitating such functionality. Correspondingly, user device 220B may, for example, be configured for use by a purchaser or other acquirer/recipient of an item to operate with an electronic commerce or marketplace system of the cloud environment to purchase items and/or with shipping management system of cloud-based application 211 for requesting and processing return shipment of various purchased or otherwise acquired items. Accordingly, the illustrated embodiment of user device 220B includes computing resource 230B, as may be utilized in facilitating such functionality. User device 220C of the illustrated embodiment comprises a tablet device having a processor, memory, and input/output useful to enable interaction with an electronic commerce or marketplace system of the cloud environment and/or shipping management system of cloud-based application 211, according to embodiments herein. User device 220D of the illustrated embodiment comprises a smartphone having a processor, memory, and input/output useful to enable interaction with an electronic commerce or marketplace system of the cloud environment and/or shipping management system of cloud-based application 211, according to embodiments herein. Such user device configurations may be particularly well suited for use by purchasers or other recipients of items in an electronic commerce marketplace cloud environment. Of course, any or all such user devices may likewise be utilized by a merchant or other shipper in such an electronic commerce marketplace cloud environment. Additionally, any or all such user devices may comprise or otherwise be in communication with any number of computing resources, as may or may not be utilized through operation of various embodiments herein.

Although, in a cloud-based application configuration, a cloud-based application generally does not have direct access to computing resources coupled to the various user devices, system 200 of the illustrated embodiment is adapted according to concepts of the present invention to facilitate access to computing resources 230A-230D by cloud-based application 211. Accordingly, system 200 of embodiments of the invention enables cloud-based application 211 to provide output to and/or obtain input from any or all of computing resources 230A-230D for performing various tasks associated with the functionality provided by the cloud-based application.

For example, in a shipping management system embodiment of cloud-based application 211, a merchant or other shipper may be enabled to generate shipping labels (e.g., having prepaid postage indicia thereon) and/or other documentation related to the order and/or shipment thereof, such as utilizing computing resources 230A and/or 230B. Accounts maintained with respect to a postage system embodiment of server system 232 by various individuals (shippers, purchasers, etc.) and/or other entities (e.g., business entities, merchants, etc.) may be utilized to facilitate such generation of postage indicia, whether individually, in batch, in combination with other documentation (e.g., shipping labels, bills of lading, manifests, customs documents, etc.), whether directly by the account holder or indirectly, by operation of the shipping management system of embodiments. Generation of such shipping documentation may comprise input of various information regarding the item being shipped (e.g., the weight of the item, such as using a scale computing resource such as computing resource 230C, hazardous material disclosures or other information relevant to the shipment of the item, such as using a scanner computing resource such as computing resource 230D), regarding the recipient and/or shipper of the item (e.g., the origination and/or destination address, such as using a scanner computing resource such as computing resource 230D), etc. Additional information (e.g., user credentials, as may include biometric information scanned using a scanner computing resource such as computing resource 230D) stored by, or in association with, a shipping management system and/or postage system, may be utilized in facilitating the generation of postage indicia and/or other shipment documents. System 200 of embodiments of the invention enables cloud-based application 211 to provide output to and/or obtain input from any or all of computing resources 230A-230D for performing various tasks associated with the foregoing shipping management system functionality.

As a further example of shipping management system functionality which may implicate the use of various computing resources, such as computing resources 230A-230D, the shipping service provider, the shipper, the recipient, and/or others may utilize information regarding the progress of an item through the mail stream for various purposes, including management, monitoring, and tracking of the shipment. For example, a user (e.g., purchaser of the shipped item, merchant shipping the item, etc.) may use a scanner computing resource, such as computing resource 230D, to scan a tracking number, such as from shipping documentation. Such tracking number information may be utilized to identify the relevant entry or entries within a shipping service provider system embodiment of server system 233 for the shipped item. Using such tracking numbers, a user may be provided information regarding the last recorded status of the shipment as it progresses through the mail stream. Various reports regarding the status of the shipment(s) may be generated and printed, such as using a printing computing resource such as computing resources 230A and/or 230B.

Figure 2B:
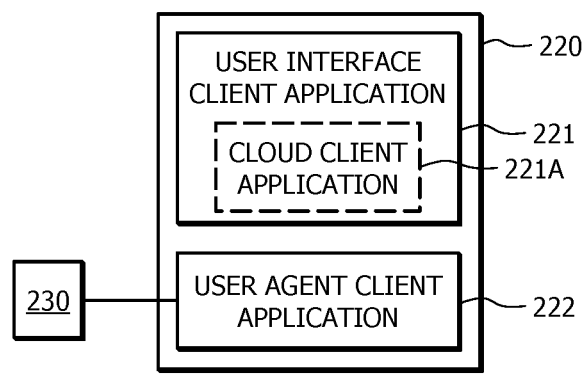
FIG. 2B shows detail with respect to a user device configuration of the cloud-based system of FIG. 2A according to embodiments of the invention.

As shown in the illustration of FIG. 2B, user devices 220 (e.g., user devices 220A-220D) of system 200 comprise one or more client applications for interacting with cloud-based application 211 to provide operation as described herein. For example, user devices 220 may comprise user interface client application 221 operable to facilitate user interaction with cloud-based application 211. User interface client application 221 may comprise a web browser (e.g., INTERNET EXPLORER, GOOGLE CHROME, or FIREFOX) hosting a cloud client application or applet associated with cloud-based application 211 and operable within the web browser. For example, a user may interact with cloud-based application 211 via cloud client application 221A executing within user interface client application 221. Continuing with the above example of a shipping management system, the user may provide input to control cloud-based application 211 to perform functions such as managing item orders, managing the picking and packing of items for order fulfillment, generating invoices, packing slips, manifests, shipping labels, and/or postage indicia, and/or tracking shipment of items using cloud client application 221A executing within user interface client application 221. However, such cloud client applications executing within a user interface client application generally does not have direct access to computing resource 230 coupled to or otherwise in communication with user device 220. Accordingly, tasks involving the providing of data from cloud-based application 211 to computing resource 230 (e.g., printing, storing data, etc.) or obtaining data by cloud-based application 211 from computing resource 230 (e.g., scanning, weighing, reading data, etc.) generally require multiple steps in order to invoke operations of the host user interface client application or cannot be performed. For example, such access may allow a cloud-based application to output data to be printed to a user device printer, to place data into and/or obtain data from a clipboard or other memory of a user device (e.g., tracking numbers, customer address data, lists of data for pasting into a spreadsheet application, etc.), to issue commands (e.g., reset or feature selections) to a user device and/or user device peripherals in communication therewith, etc. Similarly, such access may allow a cloud-based application to obtain data from an imaging device such as to read a barcode or optically scan data, to take "screen shots" of a user device screen, to obtain diagnostic information (e.g., operating system version information and/or configuration, screen size information, installed virus protection software information, firewall settings, etc.) from a user device and/or user device peripherals in communication therewith, etc. Of course, any or all such access may be performed at the request or control of a user, according to embodiments.

User devices 220 may, therefore, comprise user agent client application 222 operable to facilitate access to computing resource 230 (e.g., any or all of computing resources 230A-230D) by cloud-based application 211. In operation according to embodiments, user agent client application 222 (embodiments of which are referred to herein as a "Connect Workstation") comprises an application which is separate from user interface client application 221 and which is executed by user device 220 to implement localized access to computing resource 230. Utilizing such localized access to computing resource 230, user agent client application 222 may interact with cloud-based application 211 and/or cloud client application 221A to enable the cloud-based application to output to and/or obtain input from one or more of the computing resource. Accordingly, embodiments of the invention provide a localized application in the form of user agent client application 222 that has direct or localized access to computing resources, to directly communicate with and control the operation of those resources, whereby through cooperation of the localized application and cloud-based application the cloud-based application is enabled to access and utilize the computing resources.

Figure 3:
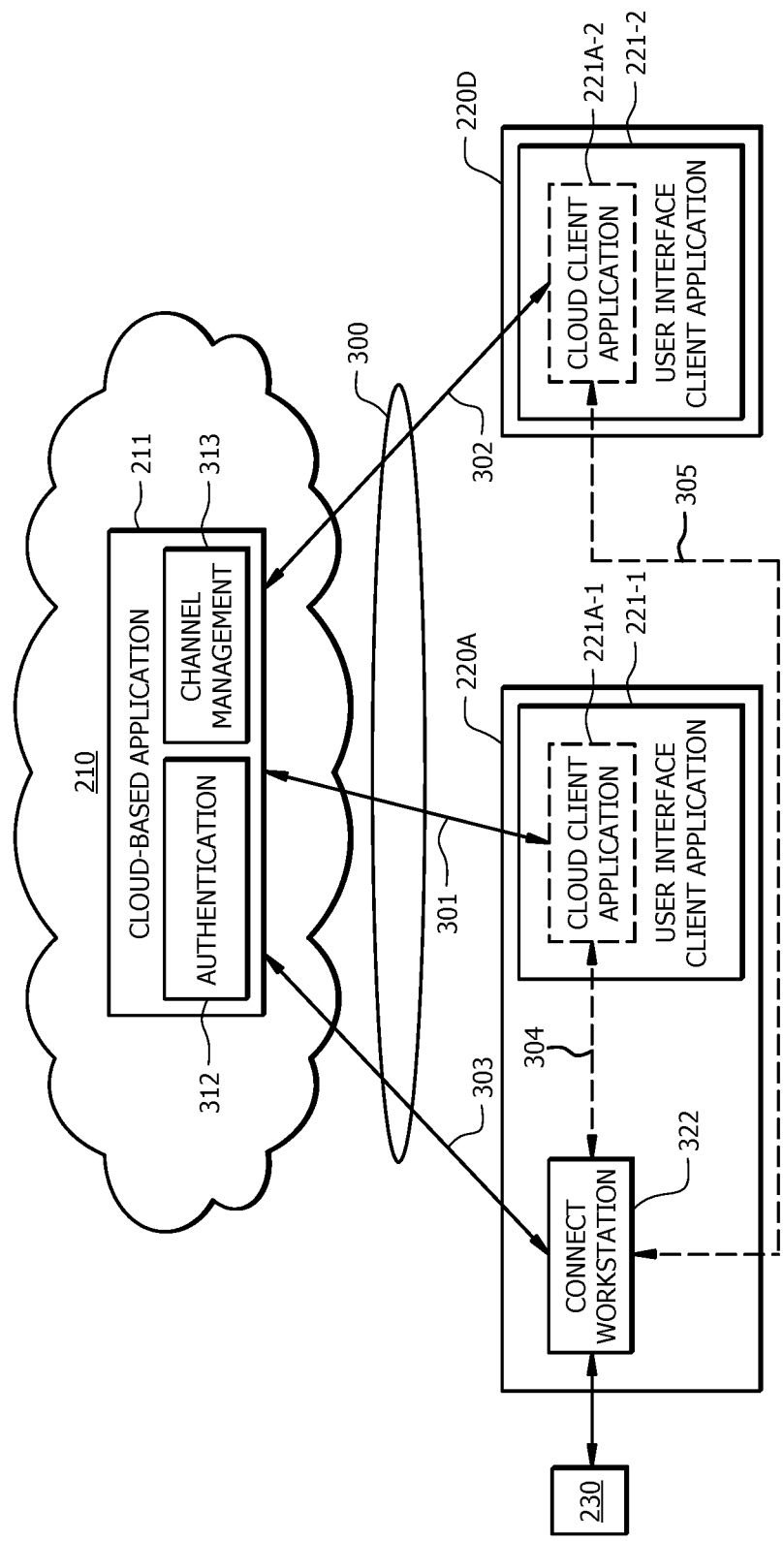
FIG. 3 shows an implementation wherein a user agent client application is implemented as a Connect Workstation according to embodiments of the invention.

FIG. 3 shows an implementation wherein a user agent client application is implemented as a Connect Workstation. It should be appreciated that, although a single instance of Connect Workstation 322 is shown in the illustrated embodiment, any number of such Connect Workstations may be installed according to embodiments. For example, multiple instances of the Connect Workstation may be installed upon a same host system (e.g., user device 220A), such as to facilitate operation as described herein with respect to a number of different cloud-based applications, a number of different computing resources, etc. For example, one or more instances of the Connect Workstation may be installed to provide computing resource access (e.g., printing, scanning, data storage, etc.) to a plurality of cloud-based applications providing different services, such as shipping management services, postage indicia generation services, word processing services, accounting services, communication services, calendaring services, etc. Additionally or alternatively, instances of the Connect Workstation may be installed upon a plurality of host systems (e.g., any or all of user devices 220A-220D), such as to facilitate operation as described herein with respect to a number of different computing resources, a number of different cloud-based applications, etc. Similarly, it should be appreciated that, although a single instance of computing resource 230 is shown in the illustrated embodiment, any number of such computing resources may be provided with respect to system 200 and/or any particular user device thereof.

Connect Workstation 322 of embodiments provides a relatively small localized application that has direct or local access to computing resource 230, to directly communicate with and control the operation of that resource. Although embodiments of Connect Workstation provide a localized deployment of an application, disadvantages typically associated with the deployment and maintenance of such localized applications may be avoided or mitigated by configurations of the Connect Workstation according to embodiments. As discussed above, an advantage of a cloud-based deployment is realized in the user or other user entity not having to obtain and maintain computing equipment (e.g., processor capability, memory capacity, etc.) sufficient to store and execute the localized application(s). However, in the case of embodiments of the Connect Workstation, the application is small and requires relatively little in the way of processing resources. Thus, most any user device having capabilities sufficient to utilize a user interface client application and cloud client application will likely already have sufficient capabilities to accommodate the Connect Workstation.

In operation according to embodiments, communication is provided between the cloud client applications of system 200 (e.g., cloud client applications 221A-1 and 221A-2) and cloud-based application 211 using inter-process communication flows anchored with network sockets (e.g., Internet sockets based on the Berkeley sockets standard) at the respective cloud client applications and cloud-based application. Accordingly communication links 301 and 302 of the illustrated embodiment may comprise socket pairs facilitating secure inter-process communications. The cloud client application may, for example, initiate and establish an open channel (e.g., comprising a communication link of communication links 301 and 302) with cloud-based application 211, whereby messages can be sent from the cloud client application or the cloud-based application at any time. The user and/or cloud client application may be authenticated, such as by operation of authentication module 312 using various user name/account and password credentials, biometric credentials, digital signature credentials, cryptographic key credentials, etc., in order to verify the user and/or cloud client application's authorization to access the cloud-based application and/or functions thereof, to establish the secure channel, etc. Operation of the channel may be managed, such as by operation of channel management module 313, to maintain/terminate the channel as appropriate, to control communications transmitted via the channel, etc.

A plurality of the aforementioned channels may be bundled to provide a grouped channel, such as to facilitate interaction and functionality for a number of affiliated users (e.g., employees of a same company, members of a family, etc.). For example, authentication module 312 may identify particular users and/or cloud client applications as being associated with a same group and thus provide grouping of the channels provided thereto, such as represented by channel group 300. The communications provided via the various channels of the channel group may comprise various directives or notifications for implementing functionality of the cloud-based application by or on behalf of the affiliated users thereof.

Connect Workstation 322 of embodiments of the invention initiates and establish an open channel (e.g., comprising a communication link 303) with cloud-based application 211, whereby messages can be sent from the Connect Workstation or the cloud-based application at any time. The Connect Workstation may be authenticated, such as by operation of authentication module 312, and likewise may be associated with a particular channel group. For example, communication link 303 for Connect Workstation 322 may be grouped with one or more communication links for cloud client applications (e.g., communication links 301 and 302), such as represented by channel group 300. Channel management module 313 may operate to arbitrate communications transmitted via a channel of the channel group to direct the appropriate communications to another channel of the channel group, thereby providing virtual communication links between various ones of the client applications (examples of such virtual communication links being shown as virtual communication links 304 and 305).

Although embodiments of Connect Workstation provide a localized deployment of an application, disadvantages typically associated with the deployment and maintenance of such localized applications may be avoided or mitigated using the aforementioned open channel. As discussed above, an advantage of a cloud-based deployment is realized in the users of a cloud-based application not having the burden of managing and monitoring the lifecycle of the application, such as to obtain and install updates in order to maintain the functionality and compatibility of the application. Embodiments of a Connect Workstation herein utilize the aforementioned open channel to facilitate server initiated messaging to manage the lifecycle of the Connect Workstation application. For example, as cloud-based application 211 is updated, possible rendering it incompatible with or otherwise non-optimal for use with Connect Workstation 322, commands may be provided using the open channel of communication link 303 to appropriately patch and/or update the Connect Workstation.

It should be appreciated that, although channel group 300 of the illustrated embodiment shows a plurality of instances of cloud client applications (possibly associated with the same or different users) and a single instance of a Connect Workstation as members of the group, a channel group utilized for facilitating cloud-based application resource access according to embodiments of the present invention may include any number of members so long as at least one Connect Workstation is provided a channel to the cloud-based application. For example, a single instance of a cloud client application and a single instance of a Connect Workstation associated as members of a channel group may be utilized to initiate cloud-based application access with respect to a computing resource. Additionally, a plurality of instances of Connect Workstations may be utilized to provide access to a variety of computing resources, such as may be disposed at different physical locations and/or which may comprise different computing resource types/configurations. It should further be appreciated that, although the illustrated embodiment of channel group 300 shows communication links with a single cloud-based application, any number of cloud-based applications may be provided communication by a channel group of embodiments, wherein each such cloud-based application may be enabled to access some or all of the computing resources associated with that channel group.

Figure 4:
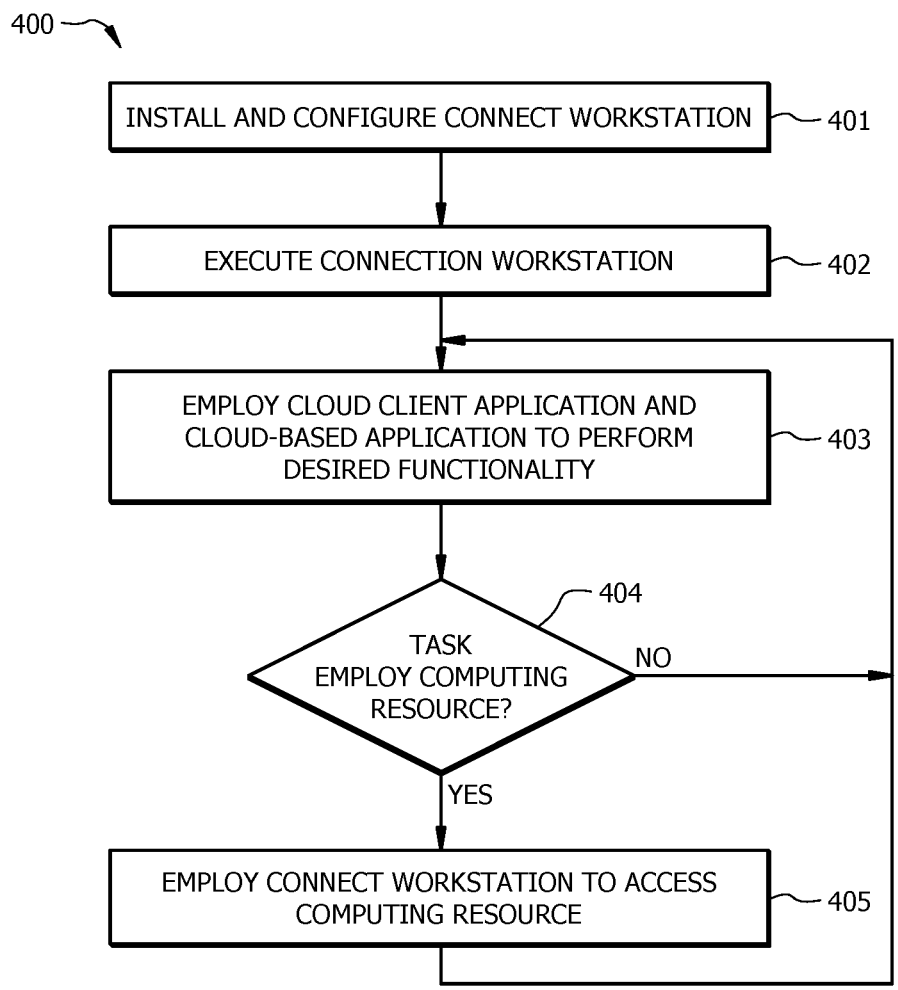
FIG. 4 shows a high level flow diagram of operation to provide access to computing resources according to embodiments of the invention.

FIG. 4 shows an embodiment of flow 400 representing operation of system 200 implementing Connect Workstation 322 to provide cooperation with cloud-based application 211 and enable access to and utilization of computing resource 230 according to embodiments of the invention. At block 401 of the illustrated embodiment Connect Workstation 322 is installed and configured. For example, the program code for Connect Workstation 322 may be downloaded from network 210 by user device 220A and installed in memory thereof.

Connect Workstation 322 is preferably configured at block 401 for association with one or more appropriate channel groups. For example, having installed Connect Workstation 322 upon user device 220A, a user thereof may provide their credentials (such as by a login dialog box presented by a user interface of the Connect Workstation installation utility) for cloud-based application 211 to enable Connect Workstation 322 to establish communication link 303 with cloud-based application 211 and to associate a channel thereof with channel group 300 to which cloud client application 221A-1 utilized by the user is also associated. The installed instance of Connect Workstation may be associated with the user, and thus instances of the user's cloud client application, automatically, such as through the use of the aforementioned user's credentials during installation/configuration of the Connect Workstation. For example, having provided valid user credentials during installation, a unique identifier for the Connect Workstation (e.g., workstation ID) may be associated with the particular user by the cloud-based application. Thus, when the user accesses the cloud-based application through a cloud client application executing in a user interface client application, the Connect Workstation and computing resources in communication therewith may be automatically associated with, and preferably available to, the user. Moreover, the Connect Workstation may be associated with the user by the cloud-based application, such as for delivery of messages and/or other functionality, even when the user is not logged into the cloud-based application through a cloud client application.

Because Connect Workstation 322 of embodiments facilitates access to computing resources, such computing resources 230, configuration of Connect Workstation 322 at block 401 may additionally or alternatively include configuration for management of access to computing resources which are in communication with the Connect Workstation. Such configuration may enable/disable access to particular computing resources through Connection Workstation, enable/disable sharing of particular computing resources through Connection Workstation, etc. For example, user device 220A may have a plurality of printers coupled thereto, wherein a subset thereof is to be provided access by Connect Workstation according to the concepts herein. Accordingly, having installed Connect Workstation 322 upon user device 220A, a user thereof may select/deselect (such as by radio button or checkbox within a dialog box presented by a user interface of the Connect Workstation configuration utility) particular ones of the plurality of printers to thereby make selected printers, but not deselected printers, available for access to cloud-based application 211. Similarly, the user may select/deselect particular ones of the plurality of printers to thereby share selected printers, but not deselected printers, with other users of the channel group. Accordingly, access of the computing resource provided by the Connect Workstation of embodiments may be by or on behalf of various users and/or instances of cloud client applications. Additionally or alternatively, a user may select or otherwise provide configuration information with respect to the computing resources, such as to establish default ways in which computing resources are accessed, identify or select particular computing resources preferred or to be made available with respect to particular tasks, etc. Although the foregoing example has been made with reference to printers, such configuration operations may be implemented with respect to any configuration and/or combination of computing resources.

At block 402 of the illustrated embodiment, Connect Workstation 322 is executed to provide operation as described herein. In operation according to embodiments, Connect Workstation 322 comprises a terminate-and-stay-resident (TSR) configuration (e.g., a program executing in the tool tray of MICROSOFT WINDOWS) which is operable as a background process providing operation as described herein. Through cooperation of the Connect Workstation and the cloud-based application, cloud-based application 211 is enabled to access and utilize computing resource 230.

Embodiments of the invention preferably implement real-time member awareness with respect to channel group 300, wherein both Connect Workstations and cloud client applications are considered as members of the channel group when associated therewith. Accordingly, as Connect Workstation 322 comes online or is otherwise initialized (e.g., after having established the channel and joined the channel group) the Connect Workstation's presences is announced to the other members of the channel group. For example, Connect Workstation 322 may broadcast a message providing information useful for implementing computing resource access according to the concepts herein. In accordance with an embodiment of the invention, Connect Workstation 322 broadcasts a member awareness message including the host system's identification (e.g., the user device computer or terminal name, such as JIM-LAPTOP-1) and/or Connect Workstation's identification (e.g., a unique or substantially unique identification string, such as CD05E0F2-5FF1-45CD-BB41-ADD8C56754AA). It should be appreciated that substantially unique, as used herein, comprises information or other item which is unique in the context of the operation described, although perhaps not unique in the universe at large. The member awareness message broadcast by Connect Workstation 322 of embodiments may additionally include a list of computing resources (e.g., printers, scanners, scales, memory devices, etc.) that have been configured as enabled or shared, preferably including information regarding the particular computing resources (e.g., indicating whether sharing is enabled for the computing resource, indicating a current operating state of the computing resource, providing information regarding a configuration of the computing resource, providing information regarding features of a computing resource, providing a name, model, and/or version of a computing resource, etc.). Accordingly, all members of the channel group, or at least all cloud client applications of the channel group of embodiments of the invention, may be made aware of the existence and availability of the Connect Workstation and/or the computing resources thereof.

It should be appreciated that member awareness messages may be broadcast according to embodiments of the invention at times other than when a Connect Workstation comes online or is otherwise initialized. For example, the forgoing member awareness message, or some portion thereof, may be broadcast to provide updated information. In operation according to embodiments, in order to provide real-time computing resource availability and/or status information, member awareness messages may be broadcast by a Connect Workstation as computing resources thereof are taken offline or are placed online. Likewise, member awareness messages may be broadcast by a Connect Workstation as the Connect Workstation itself is taken offline. Such update member awareness messages may comprise less information than the above described member awareness messages, such as to include only updated information, information for members having updated information, etc.

Member awareness messages may be communicated by means other than by broadcast according to embodiments of the invention. Member awareness messages of embodiments herein may be direct messaged or multi-cast in appropriate situations. For example, cloud client applications may come online quietly, without announcing their presence to the channel group despite their having joined the channel group. The joining of the channel group by such a cloud client application may be subsequent to a Connect Workstation coming online and broadcasting its member awareness messages. Accordingly, Connect Workstations of embodiments monitor activity with respect to the channel group and/or interact with channel group control functionality (e.g., authentication module 312 and/or channel management 313) to detect the arrival of other members, such as cloud client applications. In accordance with some embodiments, such channel group control functionality may provide signaling to make members aware of when a new member joins and/or leaves the channel group. In operation according to embodiments, such Connect Workstations proactively transmit a direct message to the newly joined member, to thereby provide a member awareness message to the newly joined member which was not present for the broadcast member awareness message.

In operation according to embodiments of the invention, a registry is kept of members of the channel group and their status to thereby facilitate members determining the status of other members at any time. For example, each Connect Workstation and/or each cloud client application may keep a registry of all Connect Workstations and/or all cloud client applications which are currently part of the channel group. Such a registry may be generated and maintained using the aforementioned member awareness messages. Using such a registry, a cloud client application, Connect Workstation, and/or cloud-based application, as well as users thereof, can immediately detect changes in other member's presence and can respond accordingly.

At block 403 of the embodiment illustrated in FIG. 4, a cloud client application is employed to interact with the cloud-based application for performing desired functionality. Staying with the foregoing example of shipping management operation, a user may utilize cloud client application 221A-1 to interact with cloud-based application 211 and invoke various desired shipping management functionality. Where such functionality employs the use of computing resource 230, such as for printing a shipping label or other document, cloud client application 221A-1 may provide command messages to cloud-based application 211 via communication link 301 to cause cloud-based application 211 to perform a particular task associated with the desired functionality, such as to generate a shipping label. For example, in operation according to the illustrated embodiment, if, while employing the cloud client application, it is determined that a task employs access to a computing resource for which the cloud-based application is not itself provided control at block 404, processing proceeds to block 405 for operation to employ the appropriate Connect Workstation to access the desired computing resource. Where, however, no such computing resource is employed by the task, processing by block 404 returns to bock 403 for continued performance of the desired functionality.

At block 405 of the illustrated embodiment, cloud client application 221A-1 may provide one or more command messages to perform a particular task associated with the desired functionality, which employs operation of computing resource 230, such as to print the shipping label. For example, interaction with cloud-based application 211 which initiates a task employing a computing resource for which the cloud-based application does not otherwise have control of, may result in a dialog box being presented by cloud client application 221A-1 for selection of a particular resource of the computing resources available through channel group 300, such as may be populated using the aforementioned registry maintained by the cloud client application. This information, perhaps as well as other information collected from the user and/or available to the cloud client application, may be utilized to generate a command message (e.g., a print control message in the present example). Because cloud-based application 211 is not itself provided control of computing resource 230, the aforementioned command for printing is provided to Connect Workstation 322 which is provided control of computing resource 230. For example, using virtual communication link 304, cloud client application 221A-1 may provide a print command message to Connect Workstation 322.

In operation according to embodiments, the command messages provided by a cloud client application to a Connect Workstation for implementing access to a computing resource includes information describing the desired operation. For example, the command message may include identification of the computing resource for which access is desired, the particular access or operation desired, data for facilitating the access or operation, etc. Such information may be provided by the user and/or may be collected or provided automatically, such as by the cloud client application, the cloud-based application, and/or the Connect Workstation. For example, a user may provide default configuration information to cloud-based application 211 in association with the user's account, such that the default configuration information is available when that user accesses the cloud-based application. This default configuration information may include information regarding a preference of computing resources or computing resource type to be used with respect to particular tasks, the configuration of the computing resources, how the status of particular tasks are to be reported, etc. When initiating a task which accesses a computing resource, the default configuration information may be accessed to populate appropriate information within a command message. Of course, the user may be provided a dialog box or other means by which any or all such information being applied to a particular task may be changed, whether permanently or on an instance by instance basis.

Continuing with the foregoing shipping label example of the shipping management operation, the print command message may identify the printer to be used, the print file(s) generated and stored by the cloud-based application to be printed (e.g., the document descriptor(s)), and the identity of the user and/or cloud client application requesting the access. This information may be utilized to select the appropriate computing resource, the appropriate data for the printing operation, and to determine if the user or cloud client application is authorized to invoke access to the computing resource. Assuming that the computing resource is appropriate for the requested task and the user/cloud client application is authorized to utilize the computing resource, Connect Workstation 322 of embodiments may use the information in the command message to communicate with cloud-based application 211 and obtain an electronic copy of the document(s) (e.g., one or more shipping labels) to be printed and to identify the particular computing resource (e.g., the particular printer) to be utilized for the printing operation. When obtaining the electronic copy of the document(s) or otherwise communicating with the cloud-based application for implementing access to a computing resource, the Connect Workstation may provide information regarding the particular computing resource selected (e.g., information regarding the computing resource included in the command message, or some portion thereof, or which is otherwise available to the Connect Workstation) to the cloud-based application, such as to facilitate formatting of the electronic document for printing (e.g., to provide appropriate page format, compatible print file, aspect ratio, data format, etc.) or otherwise providing processing to facilitate the desired access of the selected computing resource.

The command message may comprise additional or alternative information. The additional or alternative information included in a command message may comprise information such as information to configure the computing resource for the desired access action, to facilitate communications and control between the cloud client application and Connect Workstation, and/or the like. For example, the command message is preferably part of a dialog between the cloud client application and the Connect Workstation. Accordingly, the command message may include unique or substantially unique dialog identification information (e.g., a request identifier) to be included in messages of the dialog for facilitating identification of the messages with the particular dialog. As an example, after having provided the print command message to the Connect Workstation, the cloud client application may receive an acknowledgement/negative-acknowledgement (e.g., pass/fail response) message from the Connect Workstation indicating that the print command has been received and whether the requested action is to be attempted on behalf of the cloud client application. Assuming the action is attempted, one or more status message may be communicated by the Connect Workstation to the cloud client application, such as to provide information regarding the interim status of the action and/or to provide notification of the successful or unsuccessful termination of the action.

Having received the aforementioned command message, and assuming the identified computing resource is online and properly accessible by or on behalf of cloud client application 221A-1, operation at block 405 preferably implements the desired access, such as to result in the printing of the shipping label by computing resource 230 (comprising a printer in this example). Thus, Connect Workstation 322 of embodiments may operate to arbitrate access to computing resource 230 by cloud-based application 211. It should be appreciated that operation according to embodiments provides for communication of data (e.g., print documents, scan files, scale data, etc.) to/from computing resource 230 between cloud-based application 211 and Connect Workstation 322 without transmission to user interface client application 221-1 or an intermediate server (e.g., a cloud print server). Moreover, Connect Workstation 322 of embodiments is configured to utilize data which is optimized for the operation of cloud-based application functionality, such as to use zebra programming language (APL) page description language files which are highly efficient with respect to labeling applications. Additionally, the access to computing resource 230 appears to the user of cloud client application 221A-1 as having been initiated and controlled in accordance with operation of a localized application rather than a cloud-based application.

Embodiments implementing configurations of a Connect Workstation as described above not only facilitate operation whereby a cloud-based application is enabled to provide output to and/or obtain input from computing resources, but also facilitate remote access to and/or sharing of various computing resources. For example, a user of computing resource 230 need not be utilizing cloud client application 221A-1 executing on user device 220A local to the computing resource in order to access computing resource 230. The user may instead be utilizing cloud client application 221A-1 executing on user device 220D, as may be disposed remotely with respect to user device 220A hosting computing resource 230. Utilizing the channel group as discussed above, operation of cloud client application 221A-2 would be essentially as described above for cloud client application 221A-1, except that virtual communication link 305 would be utilized for command and control messages between cloud client application 221A-2 and Connect Workstation 322. Not only does such a configuration facilitate remote access to the computing resource by the user, but also allows the user to utilize user devices which otherwise are not capable of supporting the use of the computing resource. For example, user device 220D may comprise a smart phone which itself does not directly support access to computing resource 230. Nevertheless, the user may invoke the cooperation of cloud client application 221A-2 and Connect Workstation 322 to access computing resource 230 in performing one or more tasks for the functionality of cloud-based application 211. Users might, for example, use such robust access to the computing resources to facilitate their use of highly portable user devices (e.g., smart phones, PDAs, and/or tablet devices) to utilize the cloud-based application "in the field." Continuing with the above example of shipping management operation, a user utilizing a tablet device may walk the floor of a fulfilment warehouse, interacting with shipping management functionality of the cloud-based application to update order fulfilment records and print associated documents, such as packing slips, bills of lading, shipping labels, etc.

Similarly, the access to computing resource 230 provided by the Connect Workstation of embodiments is not limited to a particular user having ownership or possession of the computing resource. For example, user device 220D may be utilized by a user which, although not the owner or possessor of computing resource 230, is nevertheless a member of the channel group (e.g., employee of a same company or member of the same family as the owner or possessor of computing resource 230). Accordingly, assuming that the computing resource 230 was selected for sharing in configuration of Connect Workstation 322 and that the user and/or cloud client application 221A-2 is otherwise authorized to access computing resource 230, cloud client application 221A-2 may be provided shared access to computing resource 230. Such embodiments may be utilized to provide a companywide network of computing resources which are made available to authorized users, irrespective of the physical locations of the computing resources and/or the particular user devices utilized by a user.

It should be appreciated that the access to computing devices provided according to embodiments of the invention is not limited to access directly associated with performing tasks of the cloud-based application functionality. For example, embodiments implementing configurations of a Connect Workstation as described above facilitate operation whereby support personnel may be provided robust remote access to computing resources, such as for diagnostic and troubleshooting purposes. By joining a channel group of which a Connect Workstation in communication with a particular computing resource is a member, such support personnel may utilize a support application, having functionality similar to that of a cloud client application for communicating with the Connect Workstation, to control access to the particular computing resource, such as to determine an operational state, currently implemented configuration parameters, to communication command and control instructions to the computing resource, etc. Additionally or alternatively, such support personnel may utilize such a support application to obtain various data, such as capturing "screen shots" from the user's device, to facilitate an understanding of the operation the user is experiencing and to enable efficient diagnostics and problem resolution. Thus, such support personnel may (e.g., with the consent and permission of the user) avoid engaging a user to interact with a problematic computing resource and relay information with respect thereto.

As can be appreciated from the foregoing, although embodiments implement a user interface client application and associated cloud client application which is separate from the Connect Workstation, tight integration between a cloud client application and Connect Workstation is provided according to embodiments. Thus, a user may be provided control of various computing resources, whether disposed locally or remotely with respect to the user, through the cloud client application and associated cloud-based application using the aforementioned communication with the Connect Workstation. Additionally or alternatively, a user may be provided information regarding the various computing resources of one or more channel group, such as the availability and/or operational state of a resource (e.g., online/offline, requires attention, toner low, paper jam, etc.), the status of a task (e.g., printing in process/complete, scanning in process/complete, etc.), and/or the like.

Embodiments of the invention which implement a user interface client application and associated cloud client application which is separate from the Connect Workstation provide advantages in the separate, possibly continued, operation of the Connect Workstation. For example, a user may not continually utilized the cloud client application to access the corresponding cloud-based application or may otherwise experience periods of not being logged into the cloud-based application. However, embodiments of the separate Connect Workstation operating as a background task may nevertheless remain connected to the cloud-based application and thus in communication therewith, such as to receive update messages, alerts, initiate operation of the cloud client application, etc. Continuing with the foregoing example of shipping management functionality, the cloud-based shipping management application may send out general messages regarding the client's account from time to time. A user of the channel may not be logged into the cloud-based shipping management application when such messages are transmitted and thus, without operation of an embodiment of the Connect Workstation, would not see the notifications of these events. An example of such an event notification is when the cloud-based shipping management application automatically (and intermittently) imports orders to a client's account from their external selling platform (e.g., Amazon.com, eBay.com, etc.). When this occurs, the cloud-based shipping management application may operate to send out a notification to the client's channel that "X new orders were just imported to the shipping management application." Since the Connect Workstation of embodiments is actively running in the background of a user's device, and since the Connect Workstation is actively listening in on the group channel, the Connect Workstation can show a notification on the user's device (e.g., present a dialog box on a computer desktop). Such message presentation may be in addition to or in the alternative to any messaging that may be provided by the cloud client application (should it also be operating and logged in at a time of the message transmission). For many smaller entities that do not spend extended periods of time logged into a cloud-based application, the forgoing operation facilitates their being notified instantly when new orders are imported (or a similar noteworthy event occurs for their account). In operation according to embodiments, a user may click on the notification to open their browser to the cloud client application. This means that such users are alleviated of a need to intermittently log into the cloud-based application throughout the day to check for new activity.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    executing, by a processor, a user agent client application on a client terminal, wherein the user agent client application is adapted to provide control of at least one computing resource of one or more computing resources disposed in association with the client terminal;
    establishing, by the processor, a channel communication link between the user agent client application and a cloud-based application; and
    arbitrating, by the processor, an access to the at least one computing resource for the cloud-based application by the user agent client application based at least in part on information exchanged via the channel communication link, wherein the information relates to an invoked functionality that was invoked using a cloud client application hosted on a user client interface application, and wherein the arbitrating bypasses the user client interface application by receiving, by the user agent client application, at least one command from the cloud-based application that control the access to the at least one computing resource via the channel communication link.

2. The method of claim 1, wherein the channel communication link comprises a socket pair channel providing secure communication between the user agent client application and the cloud-based application.

3. The method of claim 1, wherein the channel communication link is part of a channel group, wherein the channel group comprises a plurality of open channel communication links between different nodes to the cloud-based application, and wherein intercommunication between the different nodes is provided by the plurality of open channel communication links of the channel group.

4. The method of claim 3, wherein the different nodes comprise the cloud client application, wherein the invoked functionality of the cloud-based application includes initiating a task which employs the access to the at least one computing resource, and wherein the arbitrating access to the at least one computing resource by the user agent client application is in response to the cloud client application having initiated the task which necessitates the access to the at least one computing resource.

5. The method of claim 4, wherein the different nodes further comprise a first instance and a second instance of the user agent client application, wherein the first instance of the user agent client application is the user agent client application executing on the client terminal, wherein the second instance of the user agent client application has a different computing resource associated therewith, and wherein the at least one computing resource was selected from a group of computing resources which includes the at least one computing resource and the different computing resource.

6. The method of claim 5, further comprising:
    accepting an input from a user of the cloud client application indicating a selection of the at least one computing resource.

7. The method of claim 5, further comprising:
    obtaining default configuration data indicating a selection of the at least one computing resource.

8. The method of claim 4, further comprising:
broadcasting an awareness message by the user agent client application to nodes of the different nodes when the user agent client application comes online, wherein the awareness message includes information regarding each computing resource of the at least one computing resource to the nodes of the different nodes.

9. The method of claim 8, wherein the nodes of the different nodes comprise the cloud client application, and wherein the cloud client application maintains a real-time registry of user agent client applications and their associated computing resources which are members of the channel group.

10. The method of claim 4, further comprising:
transmitting an awareness message by the user agent client application to the cloud client application when the cloud client application has joined the channel group after the user agent client application has joined the channel group.

11. The method of claim 1, wherein the at least one computing resource comprises a printer, and wherein the access to the at least one computing resource enables printing to the at least one computing resource by the cloud-based application.

12. The method of claim 1, wherein the at least one computing resource comprises a scale, and wherein the access to the at least one computing resource enables obtaining a weight of an item by the cloud-based application.

13. The method of claim 1, wherein the at least one computing resource comprises a scanner, and wherein the access to the at least one computing resource enables obtaining information by the cloud-based application which is scanned from an item.

14. The method of claim 1, wherein the executing the user agent client application on the client terminal comprises executing the user agent client application as a background task which monitors the channel communication link for command messages.

15. The method of claim 1, wherein the user agent client application is adapted to allow support personnel to access the at least one computing resource for diagnostic purposes, wherein the support personnel are remote to and different from a user of the cloud client application.

16. The method of claim 1, wherein the cloud-based application comprises a shipping management system, and wherein the access to the at least one computing resource comprises a functionality for management of shipment of an item by the shipping management system.

17. The method of claim 16, wherein the at least one computing resource comprises a printer, wherein the access to the at least one computing resource enables printing to the at least one computing resource by the shipping management system, and wherein the functionality for management of shipment of the item comprises printing a shipping label having a value bearing indicium generated in response to an electronic commerce transaction performed using the user agent client application.

18. The method of claim 16, wherein the shipping management system provides a shipping management functionality with respect to multiple shipping service providers, wherein the access to the at least one computing resource comprises obtaining an input from the at least one computing resource, and wherein the shipping management functionality facilitates providing the input obtained from the at least one computing resource to a respective system of each of the multiple shipping service providers.

19. An apparatus comprising:
a processor; and
a memory communicatively coupled to the processor, the memory storing instructions executed by the processor to:
execute a user agent client application on a client terminal, wherein the user agent client application is adapted to provide control of at least one computing resource of one or more computing resources disposed in association with the client terminal;
establish a channel communication link between the user agent client application and a cloud-based application; and
arbitrate an access to the at least one computing resource for the cloud-based application by the user agent client application based at least in part on information exchanged via the channel communication link, wherein the information relates to an invoked functionality that was invoked using a cloud client application hosted on a user client interface application, and wherein the arbitrating bypasses the user client interface application by receiving, by the user agent client application, at least one command from the cloud-based application that control the access to the at least one computing resource via the channel communication link.

20. A non-transitory computer-readable storage medium storing instructions that, when executed by one or more processors, cause the one or more processors to perform operations, the operations comprising:
executing a user agent client application on a client terminal, wherein the user agent client application is adapted to provide control of at least one computing resource of one or more computing resources disposed in association with the client terminal;
establishing a channel communication link between the user agent client application and a cloud-based application; and
arbitrating an access to the at least one computing resource for the cloud-based application by the user agent client application based at least in part on information exchanged via the channel communication link, wherein the information relates to an invoked functionality that was invoked using a cloud client application hosted on a user client interface application, and wherein the arbitrating bypasses the user client interface application by receiving, by the user agent client application, at least one command from the cloud-based application that control the access to the at least one computing resource via the channel communication link.

* * * * *